`US010012234B2`

(12) United States Patent
Peer et al.

(10) Patent No.: US 10,012,234 B2
(45) Date of Patent: Jul. 3, 2018

(54) BALANCE PISTON SEAL CENTERING

(71) Applicants: David J. Peer, Olean, NY (US); Richard J. Wiederien, Bellevue, WA (US); Paul Morrison Brown, Seattle, WA (US); James M. Sorokes, Olean, NY (US); Mark J. Kuzdzal, Allegany, NY (US)

(72) Inventors: David J. Peer, Olean, NY (US); Richard J. Wiederien, Bellevue, WA (US); Paul Morrison Brown, Seattle, WA (US); James M. Sorokes, Olean, NY (US); Mark J. Kuzdzal, Allegany, NY (US)

(73) Assignee: DRESSER-RAND COMPANY, Olean, NY (US)

( * ) Notice: Subject to any disclaimer, the term of this patent is extended or adjusted under 35 U.S.C. 154(b) by 366 days.

(21) Appl. No.: 15/075,400

(22) Filed: Mar. 21, 2016

(65) Prior Publication Data
US 2016/0281729 A1 Sep. 29, 2016

Related U.S. Application Data

(60) Provisional application No. 62/139,062, filed on Mar. 27, 2015.

(51) Int. Cl.
*F04D 29/28* (2006.01)
*F04D 29/051* (2006.01)

(52) U.S. Cl.
CPC ....... *F04D 29/0516* (2013.01); *F04D 29/284* (2013.01)

(58) Field of Classification Search
USPC ........................................ 415/104, 106, 107
See application file for complete search history.

(56) References Cited

U.S. PATENT DOCUMENTS

| 4,306,834 A | 12/1981 | Lee |
| 5,028,204 A * | 7/1991 | Kulle ................... F04D 29/122 415/105 |

(Continued)

FOREIGN PATENT DOCUMENTS

EP 0420786 A1 4/1991

OTHER PUBLICATIONS

Korean Intellectual Property Office "PCT/US2016/023989 International Search Report and Written Opinion," 13 pages dated Jul. 15, 2016.

*Primary Examiner* — Woody Lee, Jr.
*Assistant Examiner* — Theodore Ribadeneyra

(57) ABSTRACT

A balance piston seal assembly for a balance piston of a compressor is provided. The balance piston seal assembly may include a balance piston seal, a stationary support, and a gripping assembly disposed between the balance piston seal and the stationary support. The balance piston seal may be configured to be disposed about the balance piston such that an inner radial surface of the balance piston seal and an outer radial surface of the balance piston define a radial clearance therebetween. The stationary support may be configured to be coupled or integral with a casing of the compressor. The gripping assembly may be configured to secure the balance piston seal with the stationary support and to maintain concentricity between the balance piston seal and the balance piston during thermal radial expansion of the balance piston seal relative to the balance piston.

20 Claims, 5 Drawing Sheets

(56) References Cited

U.S. PATENT DOCUMENTS

| | | | |
|---|---|---|---|
| 5,927,720 A * | 7/1999 | Zinsmeyer | F04D 29/102 |
| | | | 277/303 |
| 6,076,832 A * | 6/2000 | Pow | F16J 15/3488 |
| | | | 277/546 |
| 8,177,475 B2 * | 5/2012 | Joco | F01D 11/02 |
| | | | 415/1 |
| 2007/0063449 A1 * | 3/2007 | Muller | F04D 29/083 |
| | | | 277/411 |
| 2010/0034646 A1 | 2/2010 | Magara et al. | |
| 2010/0183438 A1 * | 7/2010 | Maier | F04D 29/0416 |
| | | | 415/229 |
| 2013/0149101 A1 | 6/2013 | Clute et al. | |
| 2014/0341706 A1 | 11/2014 | Lardy et al. | |

* cited by examiner

BALANCE PISTON SEAL CENTERING

This application claims the benefit of U.S. Provisional Patent Application having Ser. No. 62/139,062, which was filed Mar. 27, 2015. The aforementioned patent application is hereby incorporated by reference in its entirety into the present application to the extent consistent with the present application.

STATEMENT OF GOVERNMENT INTEREST

This invention was made with government support under Government Contract No. DOE-DE-FE0000493 awarded by the U.S. Department of Energy. The government has certain rights in the invention.

BACKGROUND

Compressors and systems incorporating compressors have been developed and are often utilized in a myriad of industrial processes (e.g., petroleum refineries, offshore oil production platforms, and subsea process control systems). Conventional compressors may be configured to compress a process fluid by applying kinetic energy to the process fluid to transport the process fluid from a low pressure environment to a high pressure environment. The compressed process fluid discharged from the compressors may be utilized to efficiently perform work or operate one or more downstream processes. Improvements in the efficiency of conventional compressors has increased the application of the compressors at various oil production sites. Many of the oil production sites (e.g., offshore), however, may be constrained or limited in space. Accordingly, there is an increased interest and demand for smaller and lighter compressors, or compact compressors. In addition to the foregoing, it is often desirable that the compact compressors be capable of achieving higher compression ratios (e.g., 10:1 or greater) for increased production while maintaining a compact footprint.

To achieve the higher compression ratios, conventional compact compressors may often utilize an impeller and a balance piston integrally formed with the impeller. The impeller may be coupled with a rotary shaft configured to rotate within the compact compressors to accelerate the process fluid, and the integral balance piston may be configured to balance axial thrusts generated by the rotation of the impeller. However, as the impeller rotates to accelerate the process fluid at least a portion of the compressed process fluid may leak or flow pass the impeller and the balance piston via radial clearances, thereby reducing the efficiency of the compact compressors.

In view of the foregoing, conventional compact compressors may often utilize balance piston seals (e.g., hole pattern seals) disposed about the balance piston to manage the leakage flow of the process fluid through the radial clearances. However, as the impeller accelerates to the rotational speeds necessary to achieve the higher compression ratios (e.g., 10:1 or greater), thermal energy (e.g., heat of compression) and/or centrifugal forces may cause the impeller and the balance piston to expand or grow radially outward. Additionally, the thermal energy generated from the compression of the process fluid may also cause the thermal expansion of the balance piston seal. While the rotary shaft may at least partially maintain the alignment of the impeller and the balance piston, the thermal expansion of the balance piston seal may cause misalignment of the balance piston seal relative to the balance piston. For example, the thermal expansion of the balance piston seal may cause the balance piston seal to become radially offset from the balance piston, thereby resulting in the eccentric rotation of the balance piston relative to or within the balance piston seal. The eccentric rotation of the balance piston within the balance piston seal may decrease operational efficiencies, and may ultimately result in damage to the compact compressors and/or components thereof. For example the eccentric rotation may cause incidental contact between the rotating balance piston and the balance piston seal, which may result in damage to the balance piston and/or the balance piston seal.

What is needed, then, is an improved balance piston seal assembly and method for controlling a radial clearance between a balance piston and a balance piston seal.

SUMMARY

Embodiments of the disclosure may provide a balance piston seal assembly for a balance piston of a compressor. The balance piston seal assembly may include a balance piston seal, a stationary support, and a gripping assembly disposed between the balance piston seal and the stationary support. The balance piston seal may be configured to be disposed about the balance piston such that an inner radial surface of the balance piston seal and an outer radial surface of the balance piston define a radial clearance therebetween. The stationary support may be configured to be coupled or integral with a casing of the compressor. The gripping assembly may be configured to secure the balance piston seal with the stationary support and to maintain concentricity between the balance piston seal and the balance piston during thermal radial expansion of the balance piston seal relative to the balance piston.

Embodiments of the disclosure may also provide a compressor including a casing and a rotary shaft disposed in the casing and configured to be driven by a driver. The compressor may also include an impeller coupled with and configured to be driven by the rotary shaft. The compressor may further include a balance piston integral with the impeller and configured to balance an axial thrust generated by the impeller. A balance piston seal may be disposed about the balance piston such that an inner radial surface of the balance piston seal and an outer radial surface of the balance piston define a radial clearance therebetween. A gripping assembly may be disposed between the balance piston seal and the casing. The gripping assembly may be configured to secure the balance piston seal with the casing. The gripping assembly may also be configured to maintain concentricity between the balance piston seal and the balance piston during thermal expansion of the balance piston seal relative to the balance piston.

Embodiments of the disclosure may also provide a compression system including a driver and a compressor coupled with and configured to be driven by the driver. The compressor may include a casing, and an inlet coupled or integral with the casing, and a rotary shaft disposed in the casing and configured to couple the compressor with the driver. The inlet and the casing may at least partially define a fluid pathway of the compressor configured to receive a process fluid. The compressor may also include an impeller coupled with, and a balance piston integral with the impeller. The impeller may be configured to be rotated by the driver via the rotary shaft, and the balance piston may be configured to balance an axial thrust generated by the rotation of the impeller. A balance piston seal may be disposed radially outward of the balance piston such that the balance piston seal and the balance piston define a radial clearance therebetween. A gripping assembly may be disposed between the balance piston seal and the casing. The gripping assembly may be configured to secure the balance piston seal with the casing. The gripping assembly may also be configured maintain concentricity between the balance piston seal and the balance piston during thermal expansion of the balance piston seal.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
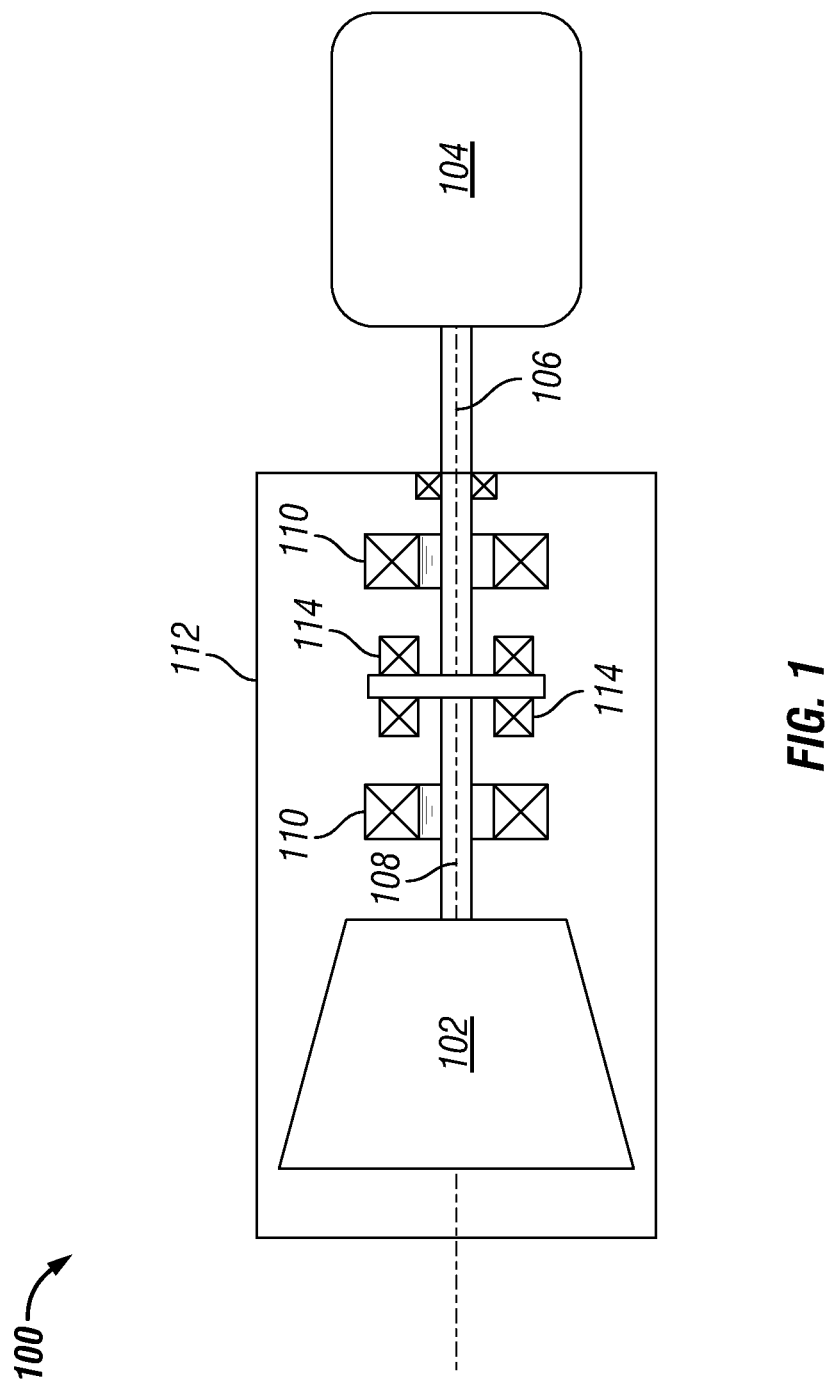
FIG. 1 illustrates a schematic view of an exemplary compression system including a compressor, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a schematic view of an exemplary compression system 100, according to one or more embodiments. The compression system 100 may include, amongst other components, one or more compressors 102 (one is shown), a driver 104, and a drive shaft 106 configured to operatively couple the compressor 102 with the driver 104. The compression system 100 may be configured to compress or pressurize a process fluid. For example, as further described herein, the driver 104 may be configured to drive the compressor 102 via the drive shaft 106 to compress the process fluid. In an exemplary embodiment, the compression system 100 may have a compression ratio of at least about 6:1 or greater. For example, the compression system 100 may compress the process fluid to a compression ratio of about 6:1, about 6.1:1, about 6.2:1, about 6.3:1, about 6.4:1, about 6.5:1, about 6.6:1, about 6.7:1, about 6.8:1, about 6.9:1, about 7:1, about 7.1:1, about 7.2:1, about 7.3:1, about 7.4:1, about 7.5:1, about 7.6:1, about 7.7:1, about 7.8:1, about 7.9:1, about 8:1, about 8.1:1, about 8.2:1, about 8.3:1, about 8.4:1, about 8.5:1, about 8.6:1, about 8.7:1, about 8.8:1, about 8.9:1, about 9:1, about 9.1:1, about 9.2:1, about 9.3:1, about 9.4:1, about 9.5:1, about 9.6:1, about 9.7:1, about 9.8:1, about 9.9:1, about 10:1, about 10.1:1, about 10.2:1, about 10.3:1, about 10.4:1, about 10.5:1, about 10.6:1, about 10.7:1, about 10.8:1, about 10.9:1, about 11:1, about 11.1:1, about 11.2:1, about 11.3:1, about 11.4:1, about 11.5:1, about 11.6:1, about 11.7:1, about 11.8:1, about 11.9:1, about 12:1, about 12.1:1, about 12.2:1, about 12.3:1, about 12.4:1, about 12.5:1, about 12.6:1, about 12.7:1, about 12.8:1, about 12.9:1, about 13:1, about 13.1:1, about 13.2:1, about 13.3:1, about 13.4:1, about 13.5:1, about 13.6:1, about 13.7:1, about 13.8:1, about 13.9:1, about 14:1, or greater.

The compressor 102 may be a direct-inlet centrifugal compressor. The direct-inlet centrifugal compressor may be, for example, a version of a Dresser-Rand Pipeline Direct Inlet (PDI) centrifugal compressor manufactured by the Dresser-Rand Company of Olean, N.Y. The compressor 102 may have a center-hung rotor configuration or an overhung rotor configuration, as illustrated in FIG. 1. In an exemplary embodiment, the compressor 102 may be an axial-inlet centrifugal compressor. In another embodiment, the compressor 102 may be a radial-inlet centrifugal compressor. As previously discussed, the compression system 100 may include one or more compressors 102. For example, the compression system 100 may include a plurality of compressors (not shown). In another example, illustrated in FIG. 1, the compression system 100 may include a single compressor 102. The compressor 102 may be a supersonic compressor or a subsonic compressor. In at least one embodiment, the compression system 100 may include a plurality of compressors (not shown), and at least one compressor of the plurality of compressors is a subsonic compressor. In another embodiment, illustrated in FIG. 1, the compression system 100 includes a single compressor 102, and the single compressor 102 is a supersonic compressor.

The compressor 102 may include one or more stages (not shown). In at least one embodiment, the compressor 102 may be a single-stage compressor. In another embodiment, the compressor 102 may be a multi-stage centrifugal compressor. Each stage (not shown) of the compressor 102 may be a subsonic compressor stage or a supersonic compressor stage. In an exemplary embodiment, the compressor 102 may include a single supersonic compressor stage. In another embodiment, the compressor 102 may include a plurality of subsonic compressor stages. In yet another embodiment, the compressor 102 may include a subsonic compressor stage and a supersonic compressor stage. Any one or more stages of the compressor 102 may have a compression ratio greater than about 1:1. For example, any one or more stages of the compressor 102 may have a compression ratio of about 1.1:1, about 1.2:1, about 1.3:1, about 1.4:1, about 1.5:1, about 1.6:1, about 1.7:1, about 1.8:1, about 1.9:1, about 2:1, about 2.1:1, about 2.2:1, about 2.3:1, about 2.4:1, about 2.5:1, about 2.6:1, about 2.7:1, about 2.8:1, about 2.9:1, about 3:1, about 3.1:1, about 3.2:1, about 3.3:1, about 3.4:1, about 3.5:1, about 3.6:1, about 3.7:1, about 3.8:1, about 3.9:1, about 4:1, about 4.1:1, about 4.2:1, about 4.3:1, about 4.4:1, about 4.5:1, about 4.6:1, about 4.7:1, about 4.8:1, about 4.9:1, about 5:1, about 5.1:1, about 5.2:1, about 5.3:1, about 5.4:1, about 5.5:1, about 5.6:1, about 5.7:1, about 5.8:1, about 5.9:1, about 6:1, about 6.1:1, about 6.2:1, about 6.3:1, about 6.4:1, about 6.5:1, about 6.6:1, about 6.7:1, about 6.8:1, about 6.9:1, about 7:1, about 7.1:1, about 7.2:1, about 7.3:1, about 7.4:1, about 7.5:1, about 7.6:1, about 7.7:1, about 7.8:1, about 7.9:1, about 8.0:1, about 8.1:1, about 8.2:1, about 8.3:1, about 8.4:1, about 8.5:1, about 8.6:1, about 8.7:1, about 8.8:1, about 8.9:1, about 9:1, about 9.1:1, about 9.2:1, about 9.3:1, about 9.4:1, about 9.5:1, about 9.6:1, about 9.7:1, about 9.8:1, about 9.9:1, about 10:1, about 10.1:1, about 10.2:1, about 10.3:1, about 10.4:1, about 10.5:1, about 10.6:1, about 10.7:1, about 10.8:1, about 10.9:1, about 11:1, about 11.1:1, about 11.2:1, about 11.3:1, about 11.4:1, about 11.5:1, 11 3.6:1, about 11.7:1, about 11.8:1, about 11.9:1, about 12:1, about 12.1:1, about 12.2:1, about 12.3:1, about 12.4:1, about 12.5:1, about 12.6:1, about 12.7:1, about 12.8:1, about 12.9:1, about 13:1, about 13.1:1, about 13.2:1, about 13.3:1, about 13.4:1, about 13.5:1, about 13.6:1, about 13.7:1, about 13.8:1, about 13.9:1, about 14:1, or greater. In an exemplary embodiment, the compressor 102 may include a plurality of compressor stages, where a first stage (not shown) of the plurality of compressor stages may have a compression ratio of about 1.75:1 and a second stage (not shown) of the plurality of compressor stages may have a compression ratio of about 6.0:1.

The driver 104 may be configured to provide the drive shaft 106 with rotational energy. The drive shaft 106 may be integral or coupled with a rotary shaft 108 of the compressor 102 such that the rotational energy of the drive shaft 106 may be transmitted to the rotary shaft 108. The drive shaft 106 of the driver 104 may be coupled with the rotary shaft 108 via a gearbox (not shown) having a plurality of gears configured to transmit the rotational energy of the drive shaft 106 to the rotary shaft 108 of the compressor 102. Accordingly, the drive shaft 106 and the rotary shaft 108 may spin at the same speed, substantially similar speeds, or differing speeds and rotational directions via the gearbox. The driver 104 may be a motor, such as a permanent magnetic electric motor, and may include a stator (not shown) and a rotor (not shown). It should be appreciated, however, that other embodiments may employ other types of motors including, but not limited to, synchronous motors, induction motors, and brushed DC motors, or the like. The driver 104 may also be a hydraulic motor, an internal combustion engine, a steam turbine, a gas turbine, or any other device capable of driving or rotating the rotary shaft 108 of the compressor 102.

The compression system 100 may include one or more radial bearings 110 directly or indirectly supported by a housing 112 of the compression system 100. The radial bearings 110 may be configured to support the drive shaft 106 and/or the rotary shaft 108. The radial bearings 110 may be oil film bearings. The radial bearings 110 may also be magnetic bearings, such as active magnetic bearings, passive magnetic bearings, or the like. The compression system 100 may also include one or more axial thrust bearings 114 disposed adjacent the rotary shaft 108 and configured to control the axial movement of the rotary shaft 108. The axial thrust bearings 114 may be magnetic bearings configured to at least partially support and/or counter thrust loads or forces generated by the compressor 102.

The process fluid pressurized, circulated, contained, or otherwise utilized in the compression system 100 may be a fluid in a liquid phase, a gas phase, a supercritical state, a subcritical state, or any combination thereof. The process fluid may be a mixture, or process fluid mixture. The process fluid may include one or more high molecular weight process fluids, one or more low molecular weight process fluids, or any mixture or combination thereof. As used herein, the term "high molecular weight process fluids" refers to process fluids having a molecular weight of about 30 grams per mole (g/mol) or greater. Illustrative high molecular weight process fluids may include, but are not limited to, hydrocarbons, such as ethane, propane, butanes, pentanes, and hexanes. Illustrative high molecular weight process fluids may also include, but are not limited to, carbon dioxide ($CO_2$) or process fluid mixtures containing carbon dioxide. As used herein, the term "low molecular weight process fluids" refers to process fluids having a molecular weight less than about 30 g/mol. Illustrative low molecular weight process fluids may include, but are not limited to, air, hydrogen, methane, or any combination or mixtures thereof.

In an exemplary embodiment, the process fluid or the process fluid mixture may be or include carbon dioxide. The amount of carbon dioxide in the process fluid or the process fluid mixture may be at least about 80%, at least about 85%, at least about 90%, at least about 95%, at least about 96%, at least about 97%, at least about 98%, at least about 99%, or greater by volume. Utilizing carbon dioxide as the process fluid or as a component or part of the process fluid mixture in the compression system 100 may provide one or more advantages. For example, carbon dioxide may provide a readily available, inexpensive, non-toxic, and non-flammable process fluid. In another example, the relatively high working pressure of applications utilizing carbon dioxide may allow the compression system 100 incorporating carbon dioxide (e.g., as the process fluid or as part of the process fluid mixture) to be relatively more compact than compression systems incorporating other process fluids (e.g., process fluids not including carbon dioxide). Additionally, the high density and high heat capacity or volumetric heat capacity of carbon dioxide with respect to other process fluids may make carbon dioxide more "energy dense." Accordingly, a relative size of the compression system 100 and/or the components thereof may be reduced without reducing the performance of the compression system 100.

The carbon dioxide may be of any particular type, source, purity, or grade. For example, industrial grade carbon dioxide may be utilized as the process fluid without departing from the scope of the disclosure. Further, as previously discussed, the process fluids may be a mixture, or process fluid mixture. The process fluid mixture may be selected for one or more desirable properties of the process fluid mixture within the compression system 100. For example, the process fluid mixture may include a mixture of a liquid absorbent and carbon dioxide (or a process fluid containing carbon dioxide) that may enable the process fluid mixture to be compressed to a relatively higher pressure with less energy input than compressing carbon dioxide (or a process fluid containing carbon dioxide) alone.

Figure 2A:
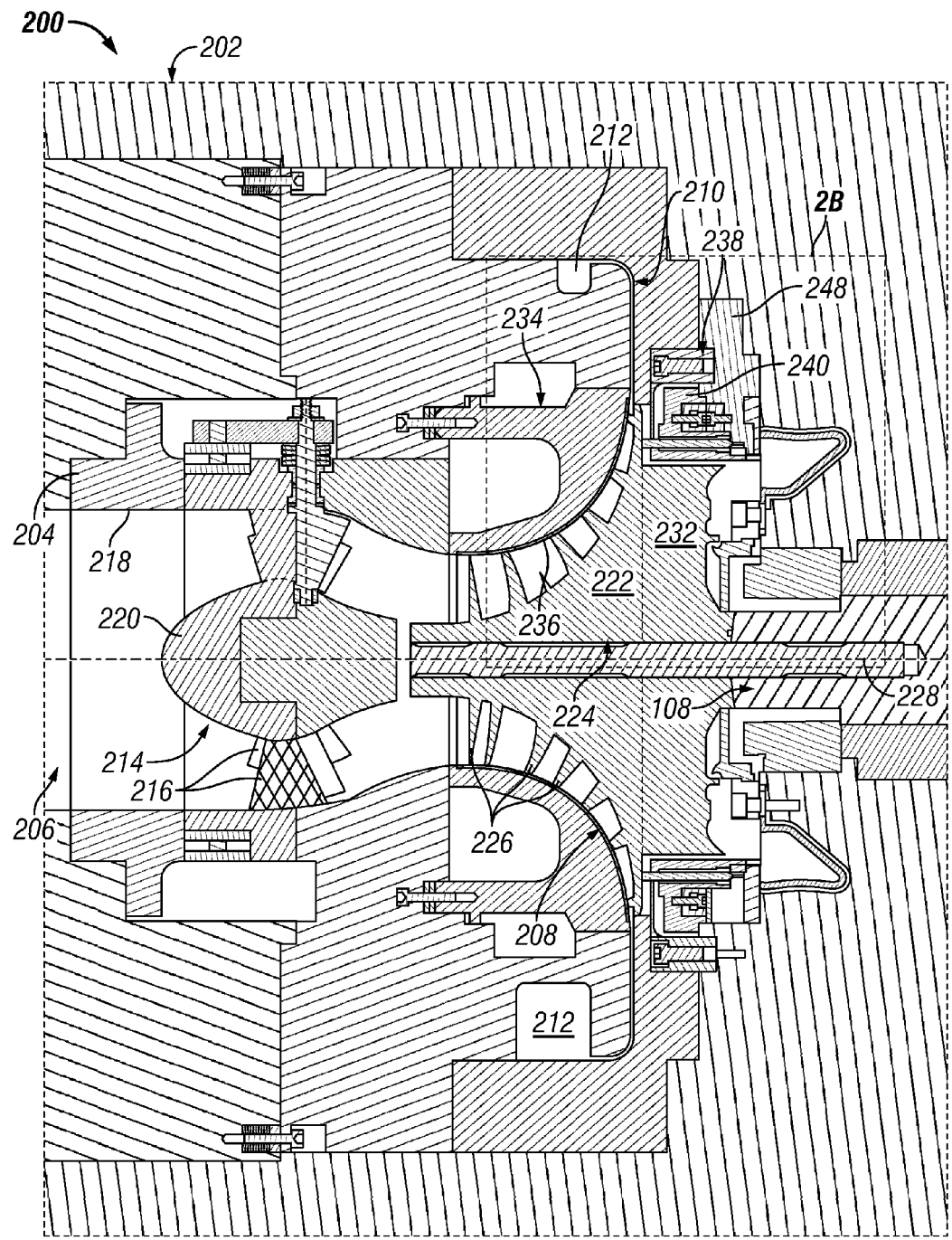
FIG. 2A illustrates a partial, cross-sectional view of an exemplary compressor that may be included in the compression system of FIG. 1, according to one or more embodiments disclosed.
Figure 2B:
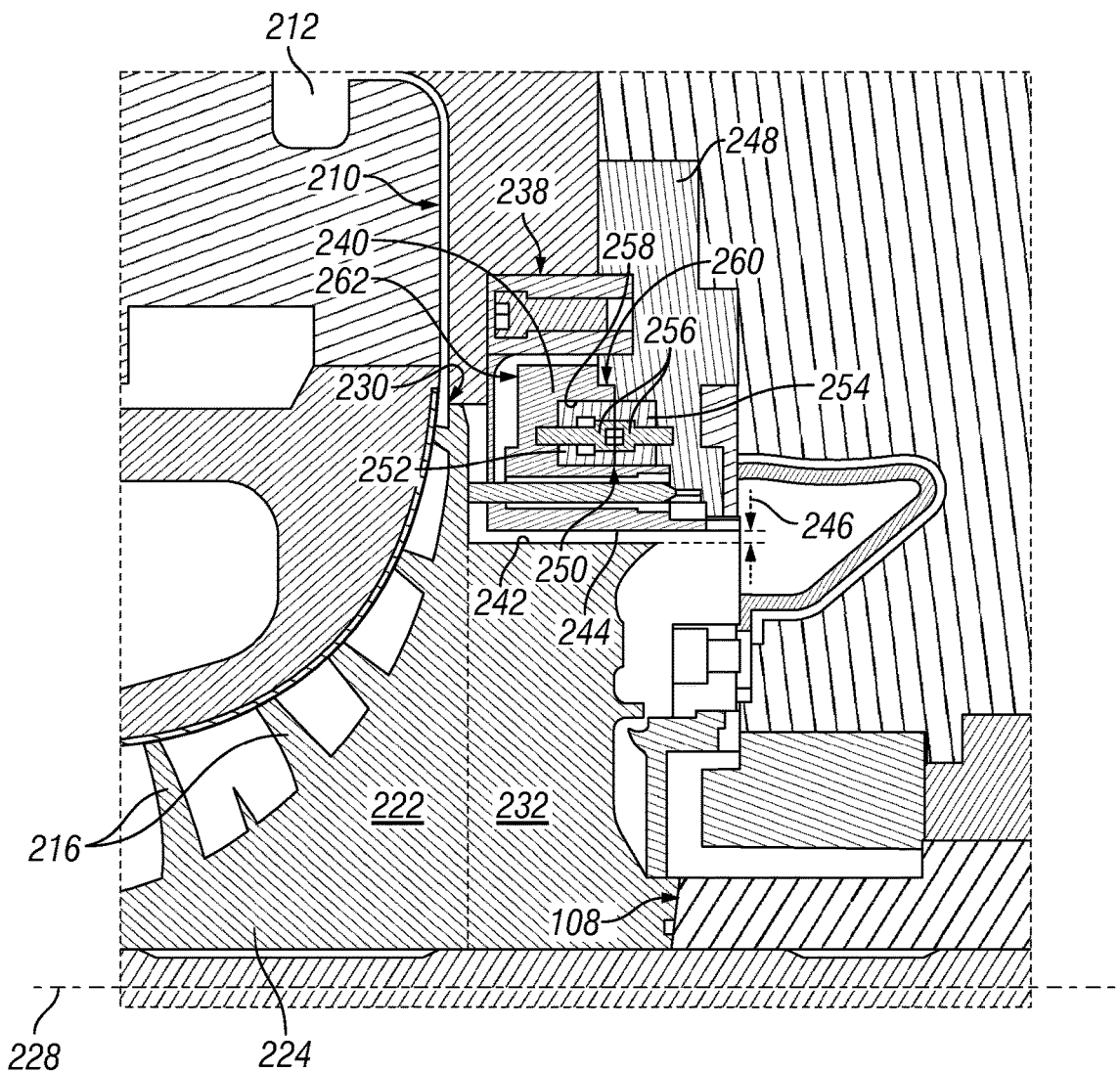
FIG. 2B illustrates an enlarged view of the portion of the compressor indicated by the box labeled 2B of FIG. 2A, according to one or more embodiments disclosed.

FIG. 2A illustrates a partial, cross-sectional view of an exemplary compressor 200 that may be included in the compression system 100 of FIG. 1, according to one or more embodiments. FIG. 2B illustrates an enlarged view of the portion of the compressor 200 indicated by the box labeled 2B of FIG. 2A, according to one or more embodiments. As illustrated in FIG. 2A, the compressor 200 may include a casing 202 and an inlet 204 (e.g., an axial inlet). The casing 202 and the inlet 204 may at least partially define a fluid pathway of the compressor 200 through which the process fluid may flow. The fluid pathway may include an inlet passageway 206 configured to receive the process fluid, an impeller cavity 208 fluidly coupled with the inlet passageway 206, a diffuser 210 (e.g., static diffuser) fluidly coupled with the impeller cavity 208, and a collector or volute 212 fluidly coupled with the diffuser 210. The casing 202 may be configured to support and/or protect one or more components of the compressor 200. The casing 202 may also be configured to contain the process fluid flowing through one or more portions or components of the compressor 200.

As illustrated in FIG. 2A, the compressor 200 may include an inlet guide vane assembly 214 configured to condition a process fluid flowing through the inlet passageway 206 to achieve predetermined or desired fluid properties and/or fluid flow attributes. Such fluid properties and/or fluid flow attributes may include flow pattern (e.g., swirl distribution), velocity, flow rate, pressure, temperature, and/or any suitable fluid property and fluid flow attribute to enable the compressor 200 to function as described herein. The inlet guide vane assembly 214 may include one or more inlet guide vanes 216 disposed in the inlet passageway 206 and configured to impart the one or more fluid properties and/or fluid flow attributes to the process fluid flowing through the inlet passageway 206. The inlet guide vanes 216 may also be configured to vary the one or more fluid properties and/or fluid flow attributes of the process fluid flowing through the inlet passageway 206. For example, respective portions of the inlet guide vanes 216 may be moveable (e.g., adjustable) to vary the one or more fluid properties and/or fluid flow attributes (e.g., swirl, velocity, mass flowrate, etc.) of the process fluid flowing through the inlet passageway 206. In an exemplary embodiment, the inlet guide vanes 216 may be configured to move or adjust within the inlet passageway 206, as disclosed in U.S. Pat. No. 8,632,302, the subject matter of which is incorporated by reference herein to the extent consistent with the present disclosure.

In another embodiment, illustrated in FIG. 2A, the inlet guide vanes 216 may extend through the inlet passageway 206 from an inner surface 218 of the inlet 204 to a hub 220 of the inlet guide vane assembly 214. The inlet guide vanes 216 may be circumferentially spaced at substantially equal intervals or at varying intervals about the hub 220. The inlet guide vanes 216 may be airfoil shaped, streamline shaped, or otherwise shaped and configured to at least partially impart the one or more fluid properties on the process fluid flowing through the inlet passageway 206.

The compressor 200 may include an impeller 222 disposed in the impeller cavity 208. The impeller 222 may have a hub 224 and a plurality of blades 226 extending from the hub 224. In an exemplary embodiment, illustrated in FIG. 2A, the impeller 222 may be an open or "unshrouded" impeller. In another embodiment, the impeller 222 may be a shrouded impeller. The impeller 222 may be configured to rotate about a longitudinal axis 228 of the compressor 200 to increase the static pressure and/or the velocity of the process fluid flowing therethrough. For example, the hub 224 of the impeller 222 may be coupled with the rotary shaft 108, and the impeller 222 may be driven or rotated by the driver 104 (see FIG. 1) via the rotary shaft 108 and the drive shaft 106. The rotation of the impeller 222 may draw the process fluid into the compressor 200 via the inlet passageway 206. The rotation of the impeller 222 may further draw the process fluid to and through the impeller 222 and accelerate the process fluid to a tip 230 (see FIG. 2B) of the impeller 222, thereby increasing the static pressure and/or the velocity of the process fluid. The plurality of blades 226 may be configured to impart the static pressure (potential energy) and/or the velocity (kinetic energy) to the process fluid to raise the velocity of the process fluid and direct the process fluid from the impeller 222 to the diffuser 210 fluidly coupled therewith. The diffuser 210 may be configured to convert kinetic energy of the process fluid from the impeller 222 into increased static pressure.

In one or more embodiments, the process fluid at the tip 230 of the impeller 222 may be subsonic and have an absolute Mach number less than one. For example, the process fluid at the tip 230 of the impeller 222 may have an absolute Mach number less than 1, less than 0.9, less than 0.8, less than 0.7, less than 0.6, less than 0.5, less than 0.4, less than 0.3, less than 0.2, or less than 0.1. Accordingly, in such embodiments, the compressors 102, 200 discussed herein may be "subsonic," as the impeller 222 may be configured to rotate about the longitudinal axis 228 at a speed sufficient to provide the process fluid at the tip 230 thereof with an absolute Mach number of less than one.

In one or more embodiments, the process fluid at the tip 230 of the impeller 222 may be supersonic and have an absolute Mach number of one or greater. For example, the process fluid at the tip 230 of the impeller 222 may have an absolute Mach number of at least 1, at least 1.1, at least 1.2, at least 1.3, at least 1.4, or at least 1.5. Accordingly, in such embodiments, the compressors 102, 200 discussed herein are said to be "supersonic," as the impeller 222 may be configured to rotate about the longitudinal axis 228 at a speed sufficient to provide the process fluid at the tip 230 thereof with an absolute Mach number of one or greater or with a fluid velocity greater than the speed of sound. In a supersonic compressor or a stage thereof, the rotational or tip speed of the impeller 222 may be about 500 meters per second (m/s) or greater. For example, the tip speed of the impeller 222 may be about 510 m/s, about 520 m/s, about 530 m/s, about 540 m/s, about 550 m/s, about 560 m/s, or greater.

As illustrated in FIGS. 2A and 2B, the compressor 200 may include a balance piston 232 configured to balance an axial thrust generated by the impeller 222 during one or more modes of operating the compressor 200. In at least one embodiment, the balance piston 232 and the impeller 222 may be separate components. For example, the balance piston 232 and the impeller 222 may be separate annular components coupled with one another. In another embodiment, illustrated in FIGS. 2A and 2B, the balance piston 232 may be integral with the impeller 222, such that the balance piston 232 and the impeller 222 may be formed from a single or unitary annular piece.

As illustrated in FIGS. 2A and 2B, the compressor 200 may also include a shroud 234 disposed proximal the impeller 222. For example, the shroud 234 may be disposed adjacent the plurality of blades 226 of the impeller 222. The shroud 234 may extend annularly about the impeller 222 such that an inner surface 236 thereof may be disposed near or proximal the plurality of blades 226 of the impeller 222. During one or more modes of operating the compressor 200, the inner surface 236 of the shroud 234 and the impeller 222 may define an impeller clearance (not shown) therebetween.

As illustrated in FIGS. 2A and 2B, the compressor 200 may include a balance piston seal assembly 238 having a balance piston seal 240 disposed about the balance piston 232 and configured to prevent or reduce a flow of the process fluid from leaking or flowing past the balance piston 232. For example, as illustrated in FIG. 2B, the balance piston seal 240 may be disposed radially outward from an outer radial surface 242 of the balance piston 232. In at least one embodiment, illustrated in FIG. 2A, the balance piston seal 240 may be or include a single, annular monolithic body. In another embodiment, the balance piston seal 240 may be formed from one or more arcuate segments configured to be coupled with one another. The balance piston seal 240 may be fabricated from one or more metals (e.g., a metal alloy). The balance piston seal 240 may be rotationally stationary with respect to the rotary shaft 108 and the balance piston 232 coupled therewith, which may rotate relative to the balance piston seal 240. An inner radial surface 244 of the balance piston seal 240 may extend circumferentially about and be radially offset from the outer radial surface 242 of the balance piston 232. The inner radial surface 244 of the balance piston seal 240 and the outer radial surface 242 of the balance piston 232 may at least partially define a radial gap or clearance 246 therebetween.

The inner radial surface 244 of the balance piston seal 240 may be or may provide a seal surface for the balance piston seal 240. It should be appreciated that the inner radial surface 244 may define any type of seal known in the art. For example, the inner radial surface 244 of the balance piston seal 240 may define a plurality of teeth (not shown) extending radially inward toward the outer radial surface 242 of the balance piston 232. Accordingly, the balance piston seal 240 may have a labyrinth seal along the inner radial surface 244 thereof. In another example, the inner radial surface 244 of the balance piston seal 240 may define a plurality of holes or openings (not shown). Accordingly, the balance piston seal 240 may provide a hole pattern sealing surface or a damper-type seal surface along the inner radial surface 244 thereof. In yet another example, the inner radial surface 244 may define a plurality of generally hexagonally-shaped openings (not shown) to thereby provide the balance piston seal 240 with a honeycomb seal surface along the inner radial surface 244 thereof.

The balance piston seal assembly 238 may include a stationary support 248 coupled or integrally formed with the casing 202. For example, the stationary support 248 may form a portion of or be integrally formed with the casing 202. In another example, the stationary support 248 may be coupled with the casing 202 via one or more mechanical fasteners (not shown). The stationary support 248 may be configured to engage or interface (i.e., directly or indirectly) with the balance piston seal 240. The stationary support 248 may also be configured to engage or interface with the balance piston seal 240 to at least partially position, align, and/or support the balance piston seal 240. For example, the stationary support 248 may be configured to engage with the balance piston seal 240 to maintain alignment or concentricity between the balance piston seal 240 and the balance piston 232. In another example, the stationary support 248 may be configured to engage with the balance piston seal 240 to position and/or support the balance piston seal 240 about the balance piston 232. In another example, the stationary support 248 may be configured to engage with the balance piston seal 240 to resist radial movement of the balance piston seal 240 relative to the balance piston 232 and/or the stationary support 248. The stationary support 248 may position and/or support the balance piston seal 240 such that the inner radial surface 244 of the balance piston seal 240 and the outer radial surface 242 of the balance piston 232 at least partially define the radial clearance 246 therebetween. The stationary support 248 may be or include one or more annular bodies. For example, the stationary support 248 may be formed from two or more annular bodies or arcuate segments (not shown) coupled with one another. In another example, illustrated in FIG. 2B, the stationary support 248 may be formed from a single annular monolithic body.

The stationary support 248 and the balance piston seal 240 may indirectly engage and/or be indirectly secured with one another via a gripping assembly 250. The gripping assembly 250 may include a first annular ring 252 and a second annular ring 254 configured to secure the balance piston seal 240 and the stationary support 248 with one another. As illustrated in FIG. 2B, the first annular ring 252 may be coupled with the balance piston seal 240, and the second annular ring 254 may be coupled with the stationary support 248. As further illustrated in FIG. 2B, the first annular ring 252 and the second annular ring 254 may be coupled with the balance piston seal 240 and the stationary support 248, respectively, via one or more mechanical fasteners 256. Illustrative mechanical fasteners may include, but are not limited to, one or more bolts, studs and nuts, or any other mechanical fasteners known in the art. While FIG. 2B illustrates the first annular ring 252 coupled with the balance piston seal 240, it should be appreciated that the first annular ring 252 may be integrally formed with the balance piston seal 240. Similarly, the second annular ring 254 may be integrally formed with the stationary support 248 or a portion of the casing 202. As illustrated in FIG. 2B, the balance piston seal 240 may define an annular channel 258 extending from a first axial end portion 260 toward a second axial end portion 262 thereof and configured to receive the first annular ring 252.

Figure 3:
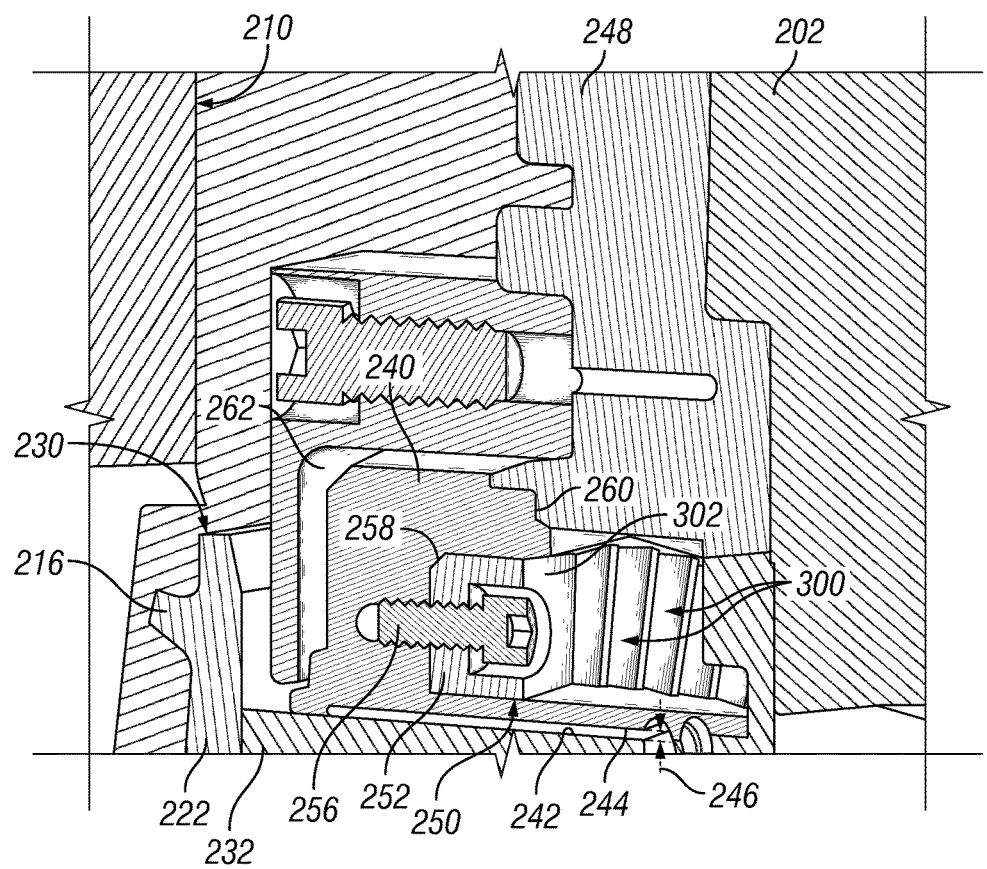
FIG. 3 illustrates a partial, perspective view of the balance piston seal of FIG. 2B and the first annular ring coupled therewith, according to one or more embodiments disclosed.
Figure 4:
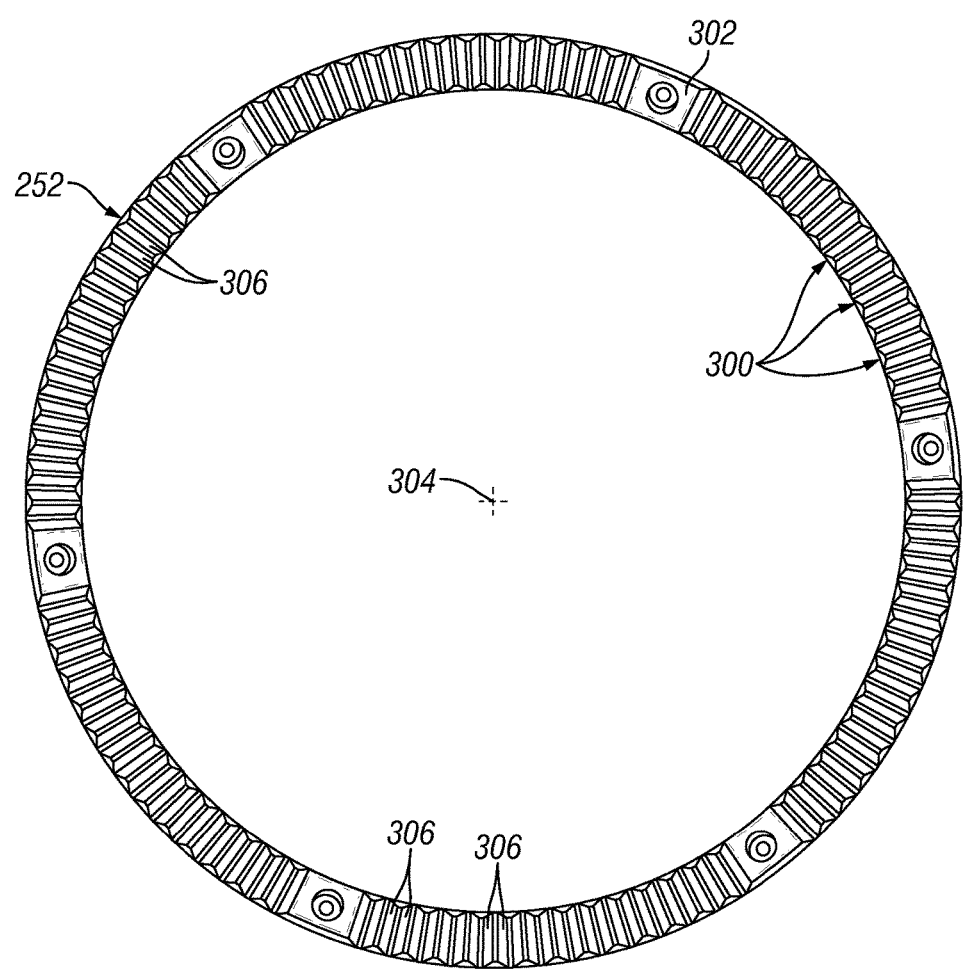
FIG. 4 illustrates a plan view of the first annular ring of FIG. 3, according to one or more embodiments disclosed.

FIG. 3 illustrates a partial, perspective view of the balance piston seal 240 of FIG. 2B and the first annular ring 252 coupled therewith, according to one or more embodiments. FIG. 4 illustrates a plan view of the first annular ring 252 of FIG. 3, according to one or more embodiments. As illustrated in FIG. 3 and further illustrated in detail in FIG. 4, the first annular ring 252 may define a plurality of axial splines or teeth 300 along an annular surface 302 thereof. The teeth 300 may be spaced at substantially equal intervals along the annular surface 302 of the first annular ring 252. The teeth 300 of the first annular ring 252 may be configured to mate with corresponding teeth (not shown) of the second annular ring 254. For example, the corresponding teeth (not shown) of the second annular ring 254 may define a plurality of grooves (not shown) configured to engage with the teeth 300 of the first annular ring 252. While only the teeth 300 of the first annular ring 252 are shown, it should be appreciated that the teeth of the second annular ring 254 may be similar and/or configured to mate or engage with the teeth 300 of the first annular ring 252. For example, the teeth (not shown) of the second annular ring 254 may define grooves configured to mate or engage with the teeth 300 of the first annular ring 252.

The gripping assembly 250 may allow radial differential expansion and/or contraction between the balance piston seal 240 and the balance piston 232 while maintaining concentricity therebetween. For example, the shape of the teeth 300 of the first annular ring 252 and/or the shape of the corresponding teeth (not shown) of the second annular ring 254 may allow the balance piston seal 240 to radially expand and/or contract (e.g., via thermal expansion/contraction) while maintaining concentricity with the balance piston 232 and/or the stationary support 248. The teeth 300 of the first annular ring 252 and/or the second annular ring 254 may have various coupling shapes, geometries, or designs. Illustrative coupling designs of the teeth 300 may include, but are not limited to, involute splines (e.g., CURVIC® coupling), prismatic or flat-sided splines (e.g., Hirth couplings or joints), axially straight splines, or any other type of face gear coupling known in the art that may facilitate alignment and/or transmission of a radial load between the balance piston seal 240 and the stationary support 248. In an exemplary embodiment, illustrated in FIG. 4, the teeth 300 of the first annular ring 252 may be shaped or configured to provide a Hirth coupling between the first annular ring 252 and the second annular ring 254. For example, in the Hirth coupling, each of the teeth 300 may be a triangularly shaped spline that tapers toward a central axis 304 of the first annular ring 252. Further, in the Hirth coupling, respective side walls 306 (see FIG. 4) of each of the teeth 300 may be radially aligned with the central axis 304 of the first annular ring 252.

In an exemplary operation of the compressor 200, with continued reference to FIGS. 2A, 2B, 3, and 4, the balance piston seal 240 and the first annular ring 252 coupled therewith may be urged toward the stationary support 248 and the second annular ring 254 coupled therewith, such that the teeth 300 of the first and second annular rings 252, 254 engage one another. The engagement between the first and second annular rings 252, 254 of the gripping assembly 250 may suspend the balance piston seal 240 about the balance piston 232 to thereby define the radial clearance 246 therebetween. The engagement between the first and second annular rings 252, 254 of the gripping assembly 250 may also concentrically align the balance piston seal 240 with the stationary support 248 and/or the balance piston 232.

At rest or prior to the start-up mode of operation of the compressor 200, the rotary shaft 108, the impeller 222, and the balance piston 232 may be stationary, and the balance piston seal 240 and the balance piston 232 may define the radial clearance 246 therebetween. During the start-up mode of operation, the driver 104 (see FIG. 1) may drive the compressor 200 from rest to the steady state mode of operation by accelerating or rotating the rotary shaft 108 (via the drive shaft 106), the impeller 222, and the balance piston 232 coupled therewith. The impeller 222 and the balance piston 232 may rotate relative to the balance piston seal 240 and about the longitudinal axis 228. The acceleration and/or rotation of the impeller 222 may draw the process fluid into the compressor 200 via the inlet passageway 206. The inlet guide vanes 216 disposed in the inlet passageway 206 may induce one or more flow properties (e.g., swirl) to the process fluid flowing therethrough. The rotation of the impeller 222 may further draw the process fluid from the inlet passageway 206 to and through the rotating impeller 222, and urge the process fluid to the tip 230 of the impeller 222, thereby increasing the velocity (e.g., kinetic energy) thereof. The process fluid from the impeller 222 may be discharged from the tip 230 thereof and directed to the diffuser 210 fluidly coupled therewith. The diffuser 210 may receive the process fluid from the impeller 222 and convert the velocity (e.g., kinetic energy) of the process fluid from the impeller 222 to potential energy (e.g., increased static pressure). The diffuser 210 may direct the process fluid downstream to the volute 212 fluidly coupled therewith. The volute 212 may collect the process fluid and deliver the process fluid to one or more downstream pipes and/or process components (not shown). The volute 212 may also be configured to increase the static pressure of the process fluid flowing therethrough by converting the kinetic energy of the process fluid to increased static pressure.

During the start-up mode of operation (e.g., cold transient start-up), the impeller 222 and the balance piston 232 coupled therewith may expand or grow radially outward toward the balance piston seal 240. For example, centrifugal forces generated from the rotation of the rotary shaft 108 may act on the impeller 222 and the balance piston 232 to thereby cause the radially outward expansion of the impeller 222 and the balance piston 232. Thermal energy or heat generated in the compressor 200 may also at least partially cause the radially outward expansion of the impeller 222 and the balance piston 232. For example, compressing the process fluid in the compressor 200 may generate heat (e.g., heat of compression) near or proximal the impeller 222 (e.g., the tip 230 of the impeller 222) and/or the balance piston 232. The heat generated may be at least partially absorbed by the impeller 222 and the balance piston 232, thereby resulting in the thermal expansion and radial growth of the impeller 222 and the balance piston 232. The thermal energy generated in the compressor 200 may also result in the thermal expansion and radial growth of the balance piston seal 240. For example, the heated, compressed process gas flowing through the radial clearance 246 may sufficiently heat the balance piston seal 240 to cause the thermal expansion and radial growth of the balance piston seal 240.

The gripping assembly 250 may be configured to maintain concentricity and/or alignment between the balance piston seal 240 and the stationary support 248 during the radial differential expansion and/or contraction of the balance piston seal 240. For example, during the radial expansion of the balance piston seal 240, the respective side walls 306 of each of the teeth 300 of the first annular ring 252 may slidingly engage respective side walls (not shown) of the corresponding teeth or grooves (not shown) of the second annular ring 254 to maintain concentricity between the balance piston seal 240 and the stationary support 248. It should be appreciated that maintaining the concentricity between the balance piston seal 240 and the stationary support 248 may increase or improve alignment or concentricity between the balance piston seal 240 and the balance piston 232. It should further be appreciated that improving alignment or concentricity between the balance piston seal 240 and the balance piston 232 may increase rotordynamic stability of the balance piston 232 and the rotary shaft 108 coupled therewith. For example, proper alignment or concentricity of the balance piston seal 240 about the balance piston 232 may allow the seal surface (e.g., hole pattern seal, labyrinth seal, etc.), defined along the inner radial surface 244, to efficiently absorb rotordynamic forces and suppress natural frequencies of the balance piston 232 and the rotary shaft 108 coupled therewith. In addition to maintaining the alignment and concentricity between the balance piston seal 240 and the balance piston 232, the gripping assembly 250 may allow any radial and/or vertical loads applied to the balance piston seal 240 to be supported by or transferred to the stationary support 248 and/or the casing 202. For example, the radial and/or vertical loads applied to the balance piston seal 240 may be transferred or translated to the stationary support 248 and the casing 202 via the teeth 300 of the first and second annular rings 252, 254 of the gripping assembly 250.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A balance piston seal assembly for a balance piston of a compressor, comprising:
   a balance piston seal configured to be disposed about the balance piston such that an inner radial surface of the balance piston seal and an outer radial surface of the balance piston define a radial clearance therebetween;
   a stationary support configured to be coupled or integral with a casing of the compressor; and
   a gripping assembly disposed between the balance piston seal and the stationary support, the gripping assembly configured to secure the balance piston seal with the stationary support and to maintain concentricity between the balance piston seal and the balance piston during thermal radial expansion of the balance piston seal relative to the balance piston.

2. The balance piston seal assembly of claim 1, wherein the gripping assembly comprises a Hirth coupling disposed between the balance piston seal and the stationary support and configured to maintain concentricity between the balance piston seal and the balance piston during thermal radial expansion of the balance piston seal relative to the balance piston.

3. The balance piston seal assembly of claim 1, wherein the gripping assembly comprises:
   a first annular ring coupled with the balance piston seal; and
   a second annular ring coupled with the stationary support and configured to engage with the first annular ring to secure the first annular ring with the stationary support and maintain concentricity between the balance piston and the balance piston seal.

4. The balance piston seal assembly of claim 3, wherein the first annular ring is coupled with the balance piston seal via a first mechanical fastener, and the second annular ring is coupled with the stationary support via a second mechanical fastener.

5. The balance piston seal assembly of claim 3, wherein the balance piston seal and the first annular ring coupled therewith are configured to expand radially outward relative to the second annular ring.

6. The balance piston seal assembly of claim 3, wherein the second annular body defines a plurality of grooves, and the first annular body defines a plurality of axial splines configured to engage with the plurality of grooves.

7. The balance piston seal assembly of claim 6, wherein the plurality of axial splines are selected from the group consisting of involute splines, prismatic splines, axially straight splines, and combinations thereof.

8. A compressor, comprising:
   a casing;
   a rotary shaft disposed in the casing and configured to be driven by a driver;
   an impeller coupled with and configured to be driven by the rotary shaft;
   a balance piston integral with the impeller and configured to balance an axial thrust generated by the impeller;
   a balance piston seal disposed about the balance piston such that an inner radial surface of the balance piston seal and an outer radial surface of the balance piston define a radial clearance therebetween; and
   a gripping assembly disposed between the balance piston seal and the casing, the gripping assembly configured to secure the balance piston seal with the casing and maintain concentricity between the balance piston seal and the balance piston during thermal expansion of the balance piston seal relative to the balance piston.

9. The compressor of claim 8, further comprising an axial inlet coupled or integral with the casing.

10. The compressor of claim 9, wherein the axial inlet and the casing at least partially define a fluid pathway of the compressor, the fluid pathway comprising:
    an inlet passageway configured to receive a process fluid comprising carbon dioxide;
    an impeller cavity fluidly coupled with the inlet passageway;
    a diffuser fluidly coupled with the impeller cavity; and
    a volute fluidly coupled with the diffuser.

11. The compressor of claim 10, wherein the impeller is configured to receive the process fluid from the inlet passageway and discharge the process fluid to the diffuser at an absolute Mach number of about 1.0 or greater.

12. The compressor of claim 11, wherein the compressor is configured to provide a compression ratio of at least about 8.1.

13. The compressor of claim 12, wherein the gripping assembly comprises a Hirth coupling disposed between the balance piston seal and the casing and configured to maintain concentricity between the balance piston seal and the balance piston during thermal radial expansion of the balance piston seal relative to the balance piston.

14. The compressor of claim 12, wherein the gripping assembly comprises:
    a first annular ring coupled with the balance piston seal; and
    a second annular ring coupled with the casing and configured to engage with the first annular ring to secure the first annular ring with the casing and maintain concentricity between the balance piston and the balance piston seal.

15. The compressor of claim 14, wherein the balance piston seal and the first annular ring coupled therewith are configured to expand radially outward relative to the second annular ring.

16. The compressor of claim 14, wherein the second annular body defines a plurality of grooves, and the first annular body defines a plurality of teeth configured to engage with the plurality of grooves.

17. The compressor of claim 16, wherein the plurality of teeth are selected from the group consisting of involute splines, prismatic splines, axially straight splines, and combinations thereof.

18. The compressor of claim 16, wherein respective side walls of each of the plurality of teeth are radially aligned with a central axis of the first annular ring.

19. A compression system, comprising:
a driver; and
a compressor coupled with and configured to be driven by the driver, the compressor comprising:
 a casing;
 an inlet coupled or integral with the casing, the inlet and the casing at least partially defining a fluid pathway of the compressor, the fluid pathway configured to receive a process fluid;
 a rotary shaft disposed in the casing and configured to couple the compressor with the driver;
 an impeller coupled with and configured to be rotated by the driver via the rotary shaft;
 a balance piston integral with the impeller and configured to balance an axial thrust generated by the rotation of the impeller;
 a balance piston seal disposed radially outward of the balance piston such that the balance piston seal and the balance piston define a radial clearance therebetween; and
 a gripping assembly disposed between the balance piston seal and the casing, the gripping assembly configured to secure the balance piston seal with the casing and maintain concentricity between the balance piston seal and the balance piston during thermal expansion of the balance piston seal.

20. The compression system of claim 19, wherein the impeller is configured to discharge the process fluid to a diffuser at an absolute Mach number of about 1.0 or greater, and wherein the compressor is configured to provide a compression ratio of at least about 8:1.

* * * * *